United States Patent [19]
Kennedy

[11] 3,742,968
[45] July 3, 1973

[54] DIFFERENTIAL PRESSURE RELIEF VALVE
[75] Inventor: Robert F. Kennedy, San Jose, Calif.
[73] Assignee: The United States of America as represented by the Secretary of the Navy, Washington, D.C.
[22] Filed: Mar. 22, 1971
[21] Appl. No.: 126,752

[52] U.S. Cl.............................. 137/68, 220/89 A
[51] Int. Cl....................... F16k 17/40, B65d 51/16
[58] Field of Search.................... 220/89 A; 137/68, 137/69, 71

[56] References Cited
UNITED STATES PATENTS

| | | | |
|---|---|---|---|
| 1,117,639 | 11/1914 | Cooey | 220/89 A X |
| 1,704,944 | 3/1929 | Johann | 137/68 X |
| 1,951,897 | 3/1934 | Binckley | 137/68 X |
| 2,304,417 | 12/1942 | Mason | 220/89 A |
| 3,482,732 | 12/1969 | Davis | 220/89 A |

Primary Examiner—Henry T. Klinksiek
Assistant Examiner—Richard Gerard
Attorney—R. S. Sciascia and Charles D. B. Curry

[57] ABSTRACT

A differential pressure relief valve wherein a diaphragm piercing device is actuated by differential pressure through a bellows. The device is self-contained and is installed in the bulkhead of a sealed container. As the pressure inside the container becomes greater than the pressure outside, the bellows compresses to a fixed compressed height of the bellows, and a spring loaded hollow plunger is released and is driven through a diaphragm on the bellows end, thus venting the container to the outside atmosphere.

In one embodiment the bellows and spring biased plunger are interlocked so that the diaphragm is moved against the combined resistance of the bellows and spring. In another embodiment the bellows is compressed independently of the spring.

10 Claims, 6 Drawing Figures

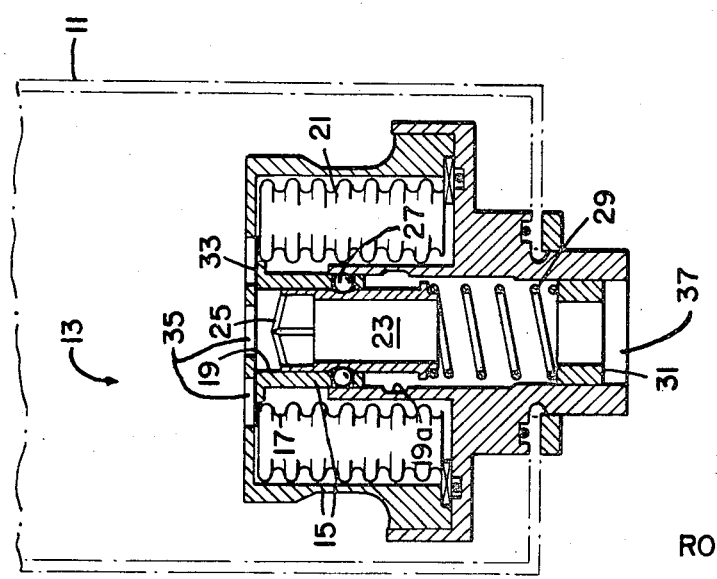
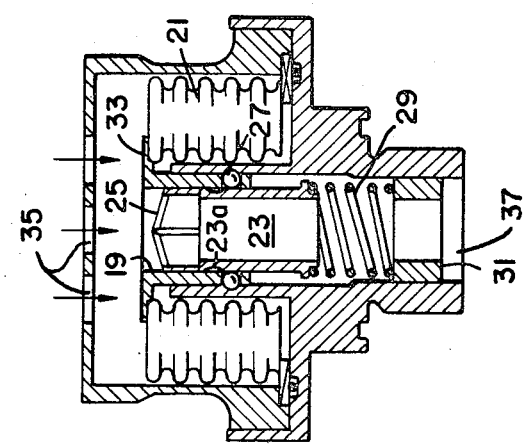
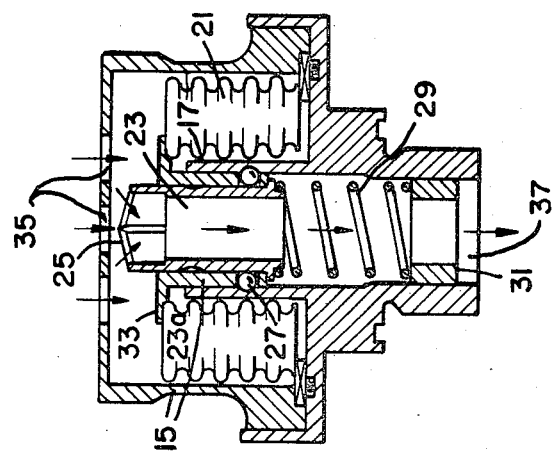

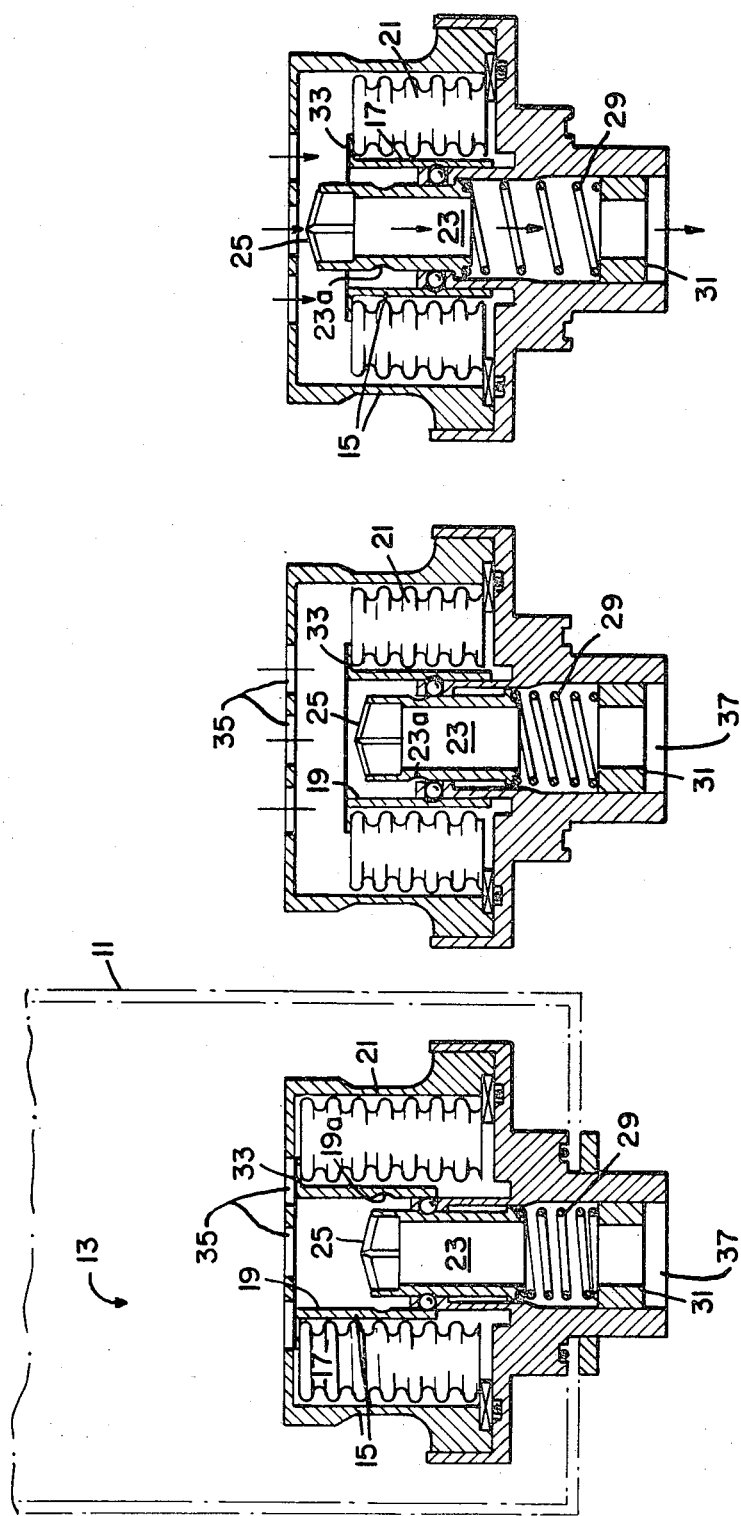

DIFFERENTIAL PRESSURE RELIEF VALVE

The invention described herein may be manufactured and used by or for The Government of the United States of America for governmental purposes without the payment of any royalties thereon or therefor.

The present invention relates generally to a differential pressure relief means to force pierce a metal diaphragm when the internal pressure of a receptacle in which the valve is mounted reaches a predetermined degree, and more particularly, to a device in which a metal diaphragm is mounted in a bellows and moves with the bellows as the bellows is compressed by the differential pressure. In conventional ruptured diaphragm devices the diaphragms and bellows operate independent of each other, which can cause a lag or delay in actuating and piercing the diaphragm. The present invention will overcome the aforementioned problem of actuating pressure relief valves. Moreover, the present invention provides a much simpler as well as a more reliable means for actuating diaphragm pressure relief devices.

The major object of the invention is to provide a spring loaded pressure relief device to force pierce a metal diaphragm.

Another object of the invention is to provide a spring loaded pressure relief device that is adjustable to actuate at narrow lateral differential pressure ranges.

Another object of the invention is to provide a differential pressure relief valve that is reliable in narrow differential pressure ranges. The following is a description of the invention and from the accompanying drawings of the preferred embodiment of the present invention wherein other objects and features will be aparent:

FIG. 1A is a sectional, sequential operational view of the device wherein the bellows and spring biased plunger are interlocked and in the pre-actuated condition;

FIG. 1B is a sectional, sequential operational view of the device in the actuated condition;

FIG. 1C is a sectional, sequential operational view of the device in the actuated condition;

FIG. 2A is a sectional, sequential operational view of the device wherein the bellows are compressed independently of the spring and in the pre-activated condition;

FIG. 2B is a sectional, sequential operational view of the device in the pressurized condition; and FIG. 2C is a sectional, sequential operational view of the device in the actuated condition.

Referring to FIGS. 1A, 1B, 2A, and 2B wherein differential pressure relief valve 13 comprises a two-part casing 15, circular bellows 21, spring biased plunger 23, 4-blade cutter 25, plunger retaining balls 27, plunger biasing spring 29, adjustable nut 31, diaphragm 33, internal air inlet ports 35, external air outlet ports 37. Plunger retaining balls 27 project into the recessed portion 23a of plunger 23 to retain plunger 23 in a fixed or preactuation position.

Referring to FIGS. 1A, 1B, and 1C wherein diaphragm 33 of pressure relief valve 13 is pierced by 4-blade cutter 25 mounted on spring biased plunger 23 when the internal pressure of receptacle 11 in which valve 13 is mounted reaches a predetermined pressure. Receptacle 11 may be any sealed container requiring a differential pressure monitoring system and is not considered as part of the invention.

Casing 15 is divided into two compartments comprising a bellows cavity 17 and a central bore 19. The lower portion of central bore 19 is threaded to accept nut 31. Assembled in bellows cavity 17 is circular bellows 21. The upper portion of circular bore 19 is superimposed by diaphragm 33 which overlaps onto the top portion of circular bellows 21 and bellows cavity 17.

Referring to FIG. 1B wherein two-part casing 15 has air inlet ports 35 which allows the internal pressure of receptacle 11 to communicate the circular bellows 21 and diaphragm 33. Plunger 23 is mounted in central bore 19 so that 4-blade cutter or piercing element 25 is mounted at one end of plunger 23, while the opposite end of plunger 23 is attached to coil biasing spring 29 which is in turn attached to hollow adjustable nut 31 located in the external air outlet 37 of central bore 19. The interior wall of external air outlet 37 is threaded to accept adjustable threaded nut 31. The effective pressure of spring 29 can be adjusted by adjustable threaded nut 31 by turning nut 31 into the threaded portion of air outlet 37 of central bore 19. The spring pressure is counteracted by the biased retaining balls 27 to prevent inadvertant actuation of plunger when the biasing spring 29 and plunger 23 are activated by movement of bellows 21. The summation of the bellows spring force and the plunger spring force determine the actuating force. The plunger spring force can be adjusted by adjustable nut 25, making it possible to vary the actuating force, thus allowing relaxation of the spring rate tolerance and still maintain capability to obtain the desired actuating force.

Referring to FIG. 1A, diaphragm piercing device or 4-blade cutter 25 is actuated and controlled by circular bellows 21. In the inoperative condition the external pressure ($P_e$) is greater than the internal pressure ($P_i$). Referring to FIG. 1B, when the internal pressure ($P_i$) exceeds the external pressure ($P_e$), plus the bellows force, plunger 23 is free to move, thereby activating 4-blade cutter piercing device 25. Referring to FIG. 1B, at a preset compressed height of the bellows 21, the spring loaded plunger 23 is driven down in central bore 19 until plunger retaining balls 27 are free to move into recess 19a thereby releasing spring loaded plunger 23 to be driven upward by biasing spring 29, causing 4-blade piercing device 25 to pierce diaphragm 33 on bellows 21, thus venting receptacle 11 to the outside atmosphere. In the actuated condition, as illustrated in FIG. 1C, the internal pressure ($P_i$) equals the external pressure ($P_e$) because plunger 23 is driven through diaphragm 33 thereby interconnecting the internal and external pressure sources.

Alternative Embodiment. Referring to FIGS. 2A, 2B, and 2C in the alternative embodiment, circular bellows 21 is compressed independently of plunger spring 29. Plunger spring 29 is preset to any desired force, but is not compressed with or actuated by the movement of bellows 21. Thus the plunger driving force is infinitely variable and actuating force is controlled entirely by the compression of spring 29.

Referring to FIG. 2A, when the external pressure ($P_e$) is greater than the internal pressure ($P_i$), plunger 33 is retained in place or locked by plunger retaining balls 27.

Referring to FIG. 2B, when the internal pressure ($P_i$) is greater than the external pressure ($P_e$), plus the bellows force, plunger 23 will move downward and recess 19a will become adjacent balls 27, thereby freeing plunger 23 to be driven upwards and activating 4-blade piercing device 25.

Referring to FIG. 2C, when 4-blade cutter 25 pierces diaphragm 33, the diaphragm is severed, thereby venting receptacle 11 to the outside atmosphere. In the actuated condition the internal pressure ($P_i$) is equal to the external pressure ($P_e$).

What is claimed is:

1. A differential pressure relief valve for a receptacle having an external ambient air pressure greater than the internal air pressure comprising in combination:
   a. a vented casing body positioned in said receptacle, said vented casing body providing an air path to the ambient external air;
   b. a compressing means positioned in said vented casing body and responsive to a differential of said ambient-internal pressure for movement within said body;
   c. a rupturable diaphragm positioned in said vented casing body and located within and operatively coupled to said compressing means for movement therewith; said diaphragm closing said air path;
   d. a diaphragm piercing means positioned in said vented casing body and including means biasing said piercing means towards said diaphragm; and
   e. retaining means holding said piercing means in a retracted position and responsive to movement of said compressing means upon a predetermined pressure differential being present to rlease said piercing means for rupturing said diaphragm.

2. The device recited in claim 1 wherein said vented casing body comprises a first chamber, second chamber, and ventng ports wherein said compressing means is positioned in said first chamber and said piercing mean is positioned in said second chamber, said diaphragm being operatively positioned within said compressing means whereby said diaphragm moves while said compressing means compresses.

3. The device recited in claim 2 wherein said compressing means is operatively connected to said piercing means whereby movement of said diaphragm is resisted by the combined actuating force at said compressing means and said piercing means.

4. The device recited in claim 3 wherein said compressing means is a bellows and is operatively connected to said piercing means.

5. The device recited in claim 4 wherein said piercing means comprises a cutter and a biased plunger located interjacent said bellows.

6. The device recited in claim 5 wherein said piercing means includes an adjusting means which is vented to ambient air pressure.

7. The device recited in claim 2 wherein said venting ports comprise an internal venting port and an external venting port wherein said interal port is in communication with said first chamber whereby the internal air pressure impinges on said compressing means and said diaphragm, said external port opening onto said piercing means and said diaphragm and in communication with ambient air pressure.

8. The device recited in claim 7 wherein said compressing means is operatively connected to said piercing means whereby said internal air pressure equals said ambient air pressure after said piercing means pierces said diaphragm.

9. The device recited in claim 8 wherein said compressing means is compressed independently of said piercing means.

10. The device recited in claim 9 wherein said compressing means is a bellows and said piercing means comprises a 4-blade cutter.

* * * * *